United States Patent [19]

Takusagawa et al.

[11] 3,963,887

[45] June 15, 1976

[54] PRESSURE-RESPONSIVE SWITCH DEVICE FOR PNEUMATIC TIRES

[75] Inventors: Takashi Takusagawa, Ome; Akira Fujikawa, Kodaira; Akira Matsuda, Higashimurayama; Masaaki Kaida, Kodaira; Shigeo Yasuda, Musashino, all of Japan

[73] Assignees: Bridgestone Tire Company Limited; Mitaka Instrument Company Limited, both of Tokyo, Japan

[22] Filed: Aug. 1, 1974

[21] Appl. No.: 494,347

[30] Foreign Application Priority Data

Sept. 20, 1973  Japan.......................... 48-109964[U]
Sept. 20, 1973  Japan.......................... 48-10965[U]

[52] U.S. Cl. ............................ 200/83 L; 200/83 S; 200/61.25; 340/58
[51] Int. Cl.² ...................................... H01H 35/34
[58] Field of Search ................... 73/49; 340/58, 242; 335/205, 206, 207; 200/61.25, 61.26, 67 F, 243, 83 R, 83 L, 83 P 83 S

[56] References Cited

UNITED STATES PATENTS

| 3,109,908 | 11/1963 | Clason ............................ 200/83 L |
| 3,430,196 | 2/1969 | Dalton ............................ 200/61.25 |
| 3,444,341 | 5/1969 | Mighton .......................... 200/83 S |
| 3,588,813 | 6/1971 | Robinson ........................ 340/58 |
| 3,636,484 | 1/1972 | Lea .................................. 335/205 |
| 3,657,501 | 4/1972 | Hoyt ................................ 200/83 S |

*Primary Examiner*—Gerald P. Tolin
*Attorney, Agent, or Firm*—Haseltin, Lake & Waters

[57] ABSTRACT

There is described a pressure-responsive switch device particularly suitable for the detection of a pressure drop in a pneumatic tire on a vehicle wheel, wherein a contact carrying movable rod member is securely urged into a contact closing position by means of a conical compression spring to actuate a warning device whenever the internal pressure of the tire drops below a predetermined level. A permanent magnet may be mounted at the contact point of the switch to impart a quick motion thereto.

18 Claims, 5 Drawing Figures

FIG. 4
FIG. 5
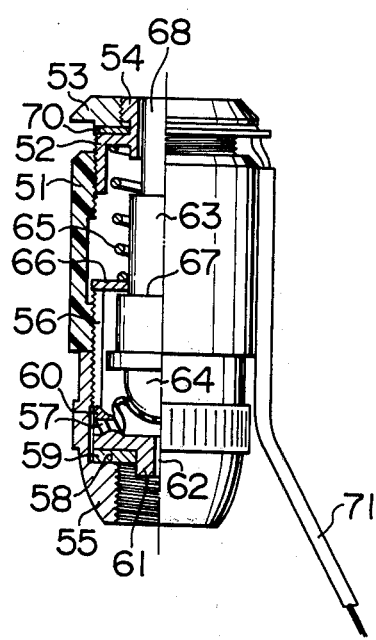
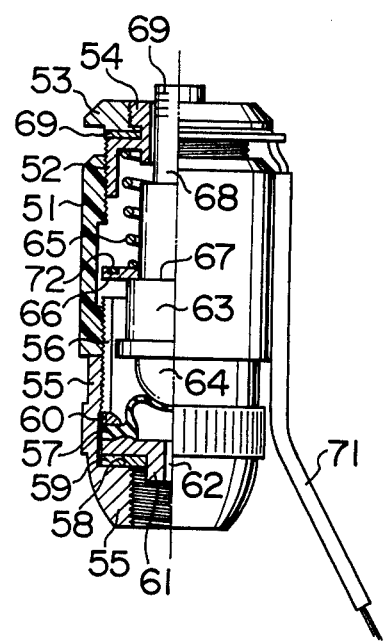

PRESSURE-RESPONSIVE SWITCH DEVICE FOR PNEUMATIC TIRES

This invention relates to a pressure-responsive switch device, and more particularly to a pressure-responsive switch device particularly suitable for use on a pneumatic tire of a vehicle wheel for detection of a pressure drop.

There have heretofore been proposed a variety of devices for the detection of pressure drops in pneumatic tires of vehicle wheels. For example, it is well known in the art to mount on a tire a pressure-responsive switch device which employs a spring-loaded movable contact within a casing for axial movement therein the contact having a shoulder portion for engagement with a pair of parallel stationary contact pins which are fixedly mounted within the casing. The movable contact is normally urged away from the stationary contact pins by means of a diaphragm but brought into contacting engagement with the contact pins when the pressure of the tire drops below a predetermined level to complete a power circuit of a warning device to notify the pressure drop to an operator of the vehicle.

The known switch device of the type just mentioned usually employs an ordinary coil spring, i.e. cylindrical coil spring in urging the movable contact into engagement with the contact pins. However, with an ordinary coil spring, operation of the movable contact is often hindered due to increased frictional resistance as the ordinary coil spring is easily inclined, deflected or buckled under the influence of the centrifugal force which is caused by the rotation of the vehicle wheel. If inclination, deflection or buckling occurs to the spring, its compressive force on the movable contact is liable to be inclined toward any one of the radial directions. Therefore, when one of the stationary contact pins comes to be in contact with the shoulder portion of the movable contact, the movable contact stops and thus does not contact with the other stationary contact pins, causing one side contact which results in an uncertain warning to an operator of the vehicle.

It is therefore a primary object of the present invention to provide a pressure-responsive switch device for detection of a pressure drop in a pneumatic tire on a vehicle wheel, which switch device overcomes the drawback of the known switch device as mentioned hereinbefore.

It is another object of the present invention to provide a pressure-responsive switch device of the nature mentioned above, employing a conical spring in urging a contact-carrying rod member in a contact closing direction.

It is still another object of the present invention to provide a pressure-responsive switch device of the nature mentioned above, wherein a contact-carrying rod member is relieved from frictional resistance which would be caused by inclination, deflection or buckling of an ordinary compression spring.

It is a further object of the present invention to provide a pressure-responsive switch device incorporating means for positively urging a movable contact into engagement with a stationary contact.

It is a still further object of the present invention to provide a pressure-responsive switch device which is provided with means for reading the pressure level of the pneumatic tire.

It is a still further object of the present invention to provide a pressure-responsive switch device which is reliable in operation and simple in construction.

Briefly, the pressure-responsive switch device of the invention comprises a cylindrical upper casing, a cylindrical lower casing having at one end means for connection to an air valve of the tire, a cylindrical connecting means interconnecting the upper and lower casings, a diaphragm securely mounted in the lower casing and having one side thereof held in communication with the internal air pressure of the tire, a rod member axially movable mounted in a cylindrical cavity defined by the upper and lower casing and held in a retracted position by the diaphragm when the tire has a normal internal pressure, a contact ring loosely fitted on the rod member and normally rested on a radial surface on the rod member, a stationary contact provided on the inner wall of the upper casing, and a conical compression spring mounted on the rod member for urging same toward the diaphragm, the rod member being moved into a protruded position by the action of the conical spring when the internal pressure of the tire drops below a predetermined level, thereby closing the contact ring on the stationary contact on the upper casing to complete a power circuit of a warning device.

In one particular form of the invention, the pressure-responsive switch device comprises a cylindrical upper casing, a cylindrical lower casing having one end internally threaded for connection to an air valve of the tire, a cylindrical connecting member interconnecting the upper and lower casings, a diaphragm securely mounted in the lower casing and having one side thereof held in communication with the internal air pressure of the tire through a core depressing member at the internally threaded end of the lower casing a rod member axially movably mounted in a cylindrical cavity defined by the upper and lower casings and normally held in a retracted portion by the diaphragm when the tire has a normal internal pressure, a contact ring loosely fitted on the rod member and normally rested on a radial surface on the rod member, a pair of semicircular stationary contacts mounted on an annular ledge on the inner wall of the upper casing, and a conical compression spring mounted on the rod member in a precharged state for urging the rod member toward the diaphragm, the rod member being moved into a protruded position by the action of the conical spring when the internal air pressure of the tire drops below a predetermined level, inversely deflecting the diaphragm and closing the contact ring on the semicircular stationary contacts on the upper casing to complete a power circuit of a warning device.

In another particular form of the invention, the pressure-responsive switch device comprises a cylindrical upper casing of an insulating material, a spring retainer of a conductive material having a skirt portion threaded into one end of the cylindrical upper casing and a rod-guide sleeve, a cylindrical lower casing of a conductive material having one end internally threaded for connection to an air valve of the tire, a cylindrical connecting member of a conductive material having opposite ends thereof securely fitted into the other ends of the upper and lower casings, a diaphragm securely mounted in the lower casing and having one side thereof held in communication with the internal air pressure of the tire through a valve core depressing member disposed at the internally threaded end of the lower casing, a rod member axially movably mounted in a cylindrical cavity defined by the upper and lower casings and normally held in a retracted position by the diaphragm, a contact ring loosely fitted over the rod member and normally rested on a radial surface on the rod member, and a conical compression spring mounted in a precharged state between the spring retainer and the contact ring for urging the rod member toward the diaphragm, the rod member being moved into a protruded position by the action of the conical spring when the internal pressure of the pneumatic tire drops below a predetermined level, inversely deflecting the diaphragm and securely closing the contact ring on the annular contact surface of the connecting member to complete a power circuit of a warning device.

The directional terms as used herein, including "upper", "lower", "upward" and "downward" are employed only for the purpose of convenience of explanation and for facilitating understanding of the invention and therefore have no particular relation with the form of actual application of the switch device of the invention.

The above and other objects, features and advantages of the invention will become clear from the following description and the appended claims, taken in conjunction with the accompanying drawings which show by way of example preferred embodiments of the invention and wherein:

FIG. 4 is a view similar to FIG. 1 but showing another embodiment of the switch device according to the invention; and FIG. 5 is a view similar to FIG. 4 but showing a modification of the embodiment shown in FIG. 4.

Figure 1:
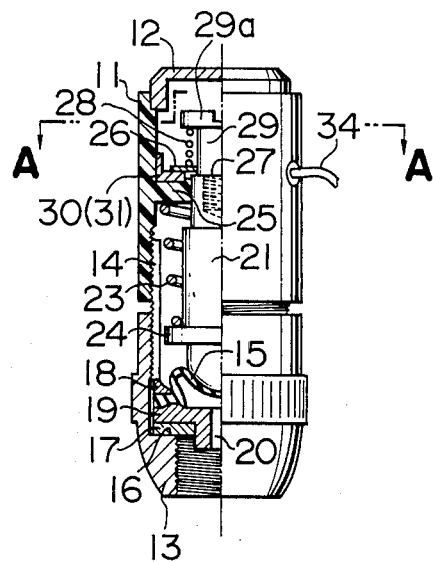
FIG. 1 is a partially sectioned side elevation of the switch device according to the present invention.
Figure 2:
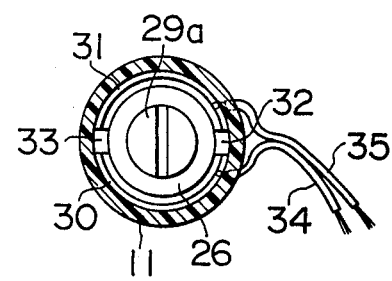
FIG. 2 is a transverse cross-section of the switch device taken along the line A-A' shown in FIG. 1.

Referring first to FIGS. 1 and 2, the pressure detector switch of the invention comprises a cylindrical upper casing 11 one end of which is closed by a detachable lid or plug member 12. The other or lower end of the upper casing 11 is securely connected to one end of a similarly cylindrical lower casing 13 by means of a cylindrical connecting member 14 which has one end securely fitted into the lower casing 13 and the other end adjustably threaded into the upper casing 11. A diaphragm 15 is mounted in the lower casing 13 and securely held in position between the lower end of the cylindrical connecting member 14 and a stepped portion 16 at an internally threaded other end of the lower casing 13 by means of a packing or annular bushing 17 and a press ring 18, together with a valve core depressing member 19. One side of the diaphragm 15 is communicated with the internal air pressure of the tire through a center aperture 20 of the valve core depressing member 19 which is adapted to be connected to an air valve stem of the tire (not shown). A rod member 21 is mounted axially movably within a cylindrical cavity defined by the upper and lower casings 11 and 13 and has a head portion 22 pressingly abutted against the other side of the diaphragm 15 by means of a conical spring 23 which is interposed between a shoulder 24 of the rod member 21 and an annular internal ledge 25 on the inner wall surface of the upper casing 11.

A contact ring 26 is loosely fitted over the rod member 21 and normally urged to and rest on a radial surface at a stepped portion 27 of the rod member 21 by means of a coil spring 28 which is interposed between the contact ring 26 and an annular flange 29a of a spring retainer 29 which is in threaded engagement with the upper end portion of the rod member 21. A pair of semicircular contacts 30, 31 are fixedly mounted on the internal ledge 25 of the upper casing 11. The semicircular contacts 30 and 31 are electrically insulated from each other by means of insulating members 32 and 33, as shown particularly in FIG. 2, and are connected to lead lines 34 and 35, respectively.

The force of the conical spring 23 acting on the shoulder 24 of the rod member 21 is smaller than the air pressure acting on the rod head 22 through the diaphragm member 15 when the tire has a normal internal pressure, so that the rod member 21 is urged upwardly against the action of the conical spring 23 with the contact ring 26 disengaged from the semicircular contacts 30 and 31 on the internal ledge 25 of the upper casing 11. When an abnormal pressure drop occurs, the rod member 21 is moved toward the core depressing member 19 into the position shown in FIG. 1, deflecting the diaphragm 15 inversely and bringing the contact ring 26 into engagement with the semicircular contacts 30 and 31 to complete the warning circuit. In this instance, the upper casing 11 and the rod member 21 are formed from an insulating material while the semicircular contacts 30, 31 and the contact ring 26 are, of course, formed from a conductive material. The material for remaining associated parts including the lower casing 13 and the spring retainer 29 may be conductive or nonconductive. The preload of the conical spring 23 may be adjusted to a suitable value in relation with the air pressure of the tire by turning in either direction the upper casing 11 which is in threaded engagement with the connecting member 14.

In operation, when the air pressure of the tire is normal, the rod member 21 is kept in a retracted inoperative position by means of the diaphragm member 15 acting against the action of the conical spring 23, with the contact ring 26 disengaged from the semicircular contacts 30 and 31, so that the warning circuit remains open and the warning device deenergized. If the internal pressure of the tire drops below a predetermined level, the rod member 21 is moved toward the core depressing member 19 by the action of the conical spring 23 and as a result the contact ring 26 is brought into contacting engagement with the semicircular stationary contacts 30 and 31 to complete the power circuit of a warning device to notify the pressure drop to an operator of the vehicle. In this instance, when the rod member 21 is moved downwardly, as seen in FIG. 1, the stepped radial surface 27 of the rod member 21 is displaced past and below the plane of the stationary contacts 30 and 31, so that the contact ring 26 is securely and positively urged into contacting engagement with the latter by the action of the coil spring 28. It is to be understood that the conical spring functions to urge the rod toward the diaphragm and at the same time toward the longitudinal axis of the casing both to preclude frictional resistance by contact with the inner wall surfaces of the casing and to prevent the conical spring from being buckled, bringing about no undesirable action to the rod. Similarly, the coil spring 28 may preferably be conical-shaped to have the same function as that of the conical spring 23.

Figure 3:
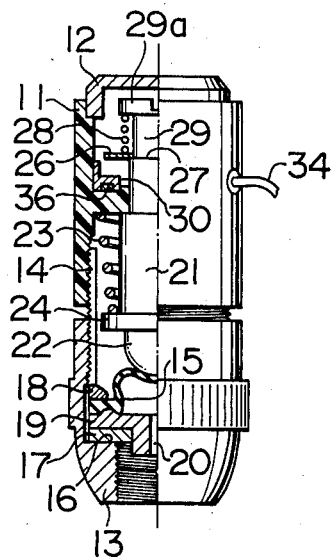
FIG. 3 is a view similar to FIG. 1 but showing a modification of the embodiment of FIG. 1.

FIG. 3 shows a modification of the embodiment of FIGS. 1 and 2, wherein at least a permanent magnet 36 is embedded beneath the semicircular contact members 30 and 31. It will be appreciated that the attractive force of the permanent magnet 36, coupled with the action of the conical spring 23, contributes to impart a quick motion to the detector switch. The modification of FIG. 3 is same as the embodiment of FIGS. 1 and 2 in other respects and therefore no further description is given herein on its construction and operation to avoid repetition.

Referring to another embodiment of the invention shown in FIG. 4, the pressure detector switch comprises a cylindrical upper casing 51 one end of which is in threaded engagement with a cylindrical skirt portion of a spring retainer 52. The spring retainer 52 has threaded thereover a nut member 53 and is centrally formed with a rod-guide sleeve 54. The other end of the upper casing 51 is connected to a cylindrical lower casing 55 by means of a cylindrical connecting member 56 which has one end threadedly connected to the lower end of the upper casing 51 and the other end securely fitted into the upper end of the lower casing 55. A diaphragm 57 is mounted in the lower casing 55 and secured in position between the lower end of the connecting member 56 and a stepped portion 58 of the lower casing 55 by means of a packing or annular bushing 59 and a press ring 60, together with a valve core depressing member 61. The lower side of the diaphragm 57 is held in communication with the air pressure of the tire through the center aperture 62 of the valve core depressing member 61 and through an air valve of the tire, not shown.

A rod member 63 is disposed axially movably in the cylindrical cavity defined by the upper and lower casings 51 and 55 and has a head portion 64 pressingly abutted against the other or upper side of the diaphragm 57 by means of a conical spring 65 which has a diverging end rested on the spring retainer 52 and the other converging end on a contact ring 66. The contact ring 66 is loosely fitted over the rod member 63 and is normally urged to rest on a radial surface of a stepped portion 67 of the rod member 63 by the action of the conical spring 65. The rod member 63 has at its upper end a reduced diameter portion 68 which is projected outwardly through the rod guide sleeve 54 of the spring retainer 52 and is graduated as indicated at 69 to allow reading of the pressure level. A terminal plate 70 which is connected to a lead line 71 is securely interposed between the spring seat 52 and the nut member 53.

In the embodiment of FIG. 4, the upper casing 51 and the rod member 63 are of an insulating material while the lower casing 55, connecting cylinder 56, contact ring 66, conical spring 65 and spring retainer 52 are of a conductive material. The compressive force of the conical spring 65 may be adjusted suitable in relation with the internal air pressure of the tire by turning in either direction the spring retainer 52 which is in threaded engagement with the upper casing 51.

When the pressure of the pneumatic tire is normal, the rod member 63 is held in a retracted position by the diaphragm 57 against the action of the conical spring 65 with the contact ring 66 disengaged from the upper end surface of the cylindrical connecting member 56, thus breaking a power circuit which includes the lower casing 55 which are grounded through the vehicle body, cylindrical connecting member 56 contact ring 66, conical spring 65, spring seat 52, terminal plate 70 and lead line 71. A warning device (not shown) which is connected to the power circuit thus remains de-energized. If the pressure of the pneumatic tire drops below a predetermined level, the rod member 63 is moved toward the valve core depressing member 61 or into the position shown in FIG. 4, deflecting the diaphragm 57 inversely and bringing the contact ring 66 into engagement with the upper end face of the cylindrical connecting member 56, completing the power circuit which leads from a power source through the lead line 71, terminal plate 70, spring retainer 52, conical spring 65, and contact ring 66, to the cylindrical connecting member 56 and lower casing 55 which are grounded through the vehicle body, thereby actuating suitable warning device (not shown) to notify the pressure drop to the vehicle operator. In this instance, the stepped radial surface 67 comes to a level below the upper end face of the connecting member 56 and the contact ring 66 is urged into contacting engagement with the upper end face of the connecting member 56 securely and positively by the action of the conical spring 65.

FIG. 5 shows a modification of the embodiment of FIG. 4, wherein a permanent magnet 72 is mounted on the contact ring 66 for imparting a quick motion to the switch device by means of the attractive force of the magnet coupled with the action of the conical spring 65. The modification of FIG. 5 is same as the embodiment of FIG. 4 in other respects and therefore no further description is given herein on its construction and operation in order to avoid unnecessary repetition. In FIGS. 4 and 5, similar component parts are designated by similar reference numerals.

While there have been described preferred embodiments of the invention it will be understood that various modifications and rearrangements may be made without departing from the scope and the spirit of the invention, as defined in the appended claims.

What is claimed is:

1. A pressure-responsive switching device for pneumatic tires, comprising:

a pneumatic tire;

a cylindrical upper casing;

a cylindrical lower casing having one end internally threaded for connection to an air valve attached to said pneumatic tire;

a cylindrical connecting member interconnecting said upper and lower casings;

a diaphragm securely mounted in said lower casing and having one side thereof held in communication with the internal air pressure of said tire through a core depressing member at the internally threaded end of said lower casing;

a rod member axially movably mounted in a cylindrical cavity defined by said upper and lower casings and normally held by said diaphragm in a retracted position wherein the lower end of said rod member is remotest from said one end of said lower cylindrical casing when said tire has a normal internal pressure;

a contact ring loosely fitted on said rod member and normaly rested on a radially protruding surface on said rod member;

a pair of semicircular stationary contacts mounted on an annular ledge formed on the inner wall of said upper casing;

a conical compression spring mounted on said rod member in a prestressed state for urging said rod member toward said diaphragm, said rod member being moved from said retracted position into a protruded position by the action of said conical spring when the internal air pressure of said tire drops below a predetermined level, the lower end of said rod member being nearest from said one end of said lower cylindrical casing inversely deflecting said diaphragm and closing said contact ring on said semi-circular stationary contacts on said upper casing to complete a power circuit of a warning device;

and a coil spring interposed between said contact ring and an annular flange on said rod member for positively and securely closing said contact ring on said semicircular stationary contacts when said rod member is urged into said protruded position.

2. A pressure-responsive switching device as defined in claim 1 wherein said conical spring is interposed between a lower surface of an annular ledge projecting radially inwardly of the inner wall of said upper casing and a shoulder portion projecting radially outwardly of said rod member with its converging end resting on said shoulder portion of said rod member and its diverging end abutting on said lower surface of said annular ledge of said upper casing.

3. A pressure-responsive switching device as defined in claim 1, further comprising at least a permanent magnet embedded beneath said semicircular stationary contacts for imparting a quick motion to the switch device.

4. A pressure-responsive switch device as defined in claim 1, wherein said pair of semicircular stationary contacts are connected to lead lines which are led in through the wall of said upper casing.

5. A pressure-responsive switch device as defined in claim 1, wherein said connecting member is adjustably threaded into said upper casing.

6. A pressure-responsive switching device for pneumatic tires, comprising:
a pneumatic tire;
a cylindrical upper casing of an insulating material;
a spring retainer of a conductive material having a skirt portion threaded into one end of said cylindrical upper casing and a rod-guide sleeve formed axially thereof;
a cylindrical lower casing of a conductive material having one end internally threaded for connection to an air valve attached to said pneumatic tire;
a cylindrical connecting member of a conductive material having opposite ends thereof securely fitted into the other ends of said upper and lower casings and having an annular contact surface;
a diaphragm securely mounted in said lower casing and having one side thereof held in communication with the internal air pressure of said tire through a valve core depressing member disposed at the internally threaded end of said lower casing;
a rod member axially movably mounted in a cylindrical cavity defined by said upper and lower casings and normally held by said diaphragm in a retracted position wherein one end of said rod member is remotest from said one end of said lower cylindrical casing with its other end slidably received in said rod-guide sleeve of said cylindrical upper casing;
a contact ring loosely fitted over said rod member and normally rested on a radially protruding surface on said rod member; and
a conical compression spring mounted in a prestressed state between said spring retainer and said contact ring for urging said rod member toward said diaphragm;
said rod member being moved from said retracted position into a protruded position by the action of said conical spring when the internal pressure of said pneumatic tire drops below a predetermined level, said one end of said rod member being nearest from said one end of said lower casing inversely deflecting said diaphragm and securely closing said contact ring on said annular contact surface of said connecting member to complete a power circuit of a warning device.

7. A pressure-responsive switch device as defined in claim 6, further comprising a nut member threaded over said rod-guide sleeve of said spring retainer.

8. A pressure-responsive switch device as defined in claim 6, wherein said rod member having an upper end portion formed in a reduced diameter and projected outwardly through said rod-guide sleeve portion of said spring retainer.

9. A pressure-responsive switch device as defined in claim 8, wherein said outwardly projected upper end of said rod member is graduated to allow reading of the pressure level of said tire.

10. A pressure-responsive switch device as defined in claim 6, further comprising a terminal plate interposed between said nut member and said spring retainer and connected to a lead line.

11. A pressure-responsive switch device as defined in claim 6, further comprising a permanent magnet fixedly mounted on said contact ring to impart a quick motion to said switch device.

12. A pressure-responsive switching device for pneumatic tires, comprising:
a pneumatic tire;
a cylindrical upper casing of an insulating material;
a spring retainer of a conductive material having a skirt portion threaded into one end of said cylindrical upper casing and rod-guide sleeve formed axially thereof;
a cylindrical lower casing of a conductive material having one end internally threaded for connection to an air valve attached to said pneumatic tire;
a cylindrical connecting member of a conductive material having at its uppermost end an annular contact surface and opposite ends thereof securely fitted into the other ends of said upper and lower casings;
a diaphragm securely mounted in said lower casing and having one side thereof held in communication with the internal air pressure of said tire through a valve core depressing member disposed at the internally threaded end of said lower casing;
a rod member axially movably mounted in a cylindrical cavity defined by said upper and lower casings and normally held by said diaphragm in a retracted position wherein one end of said rod member is remotest from one end of said lower cylindrical casing with its other end projected outwardly through said rod-guide sleeve;
a contact ring loosely fitted over said rod member and normally rested in a radially protruding surface on said rod member; and
a conical compression spring mounted in a prestressed state between said spring retainer and said contact ring for urging said rod member toward said diaphragm, said rod member being moved from said retracted position into a protruded position by the action of said conical spring when the internal pressure of said pneumatic tire drops below a predetermined level, said one end of said rod member being nearest from said one end of said lower casing inversely deflecting said diaphragm securely closing said contact ring on said annular contact surface of said connecting member to complete a power circuit of a warning device.

13. A pressure-responsive switch device as defined in claim 12, further comprising a nut member threaded over said rod-guide sleeve of said spring retainer.

14. A pressure-responsive switch device as defined in claim 12, further comprising a terminal plate interposed between said nut member and said spring retainer and connected to a lead line.

15. A pressure-responsive switch device as defined in claim 12, further comprising a permanent magnet fixedly mounted on said contact ring to impart a quick motion to said switch device.

16. A pressure-responsive switch device as defined in claim 12, wherein said rod member has an upper end portion formed in a reduced diameter and projected outwardly through said rod-guide sleeve portion of said spring retainer.

17. A pressure-responsive switch device as defined in claim 16, wherein said outwardly projected upper end of said rod member is graduated to allow reading of the pressure level of said tire.

18. A pressure-responsive switching device for pneumatic tires, containing:
- a pneumatic tire;
- a cylindrical upper casing;
- a cylindrical lower casing having one end internally threaded for connection to an air valve attached to said pneumatic tire;
- a cylindrical connecting member interconnecting said upper and lower casings;
- a diaphragm securely mounted in said lower casing and having one side thereof held in communication with the internal air pressure of said tire through a core depressing member at the internally threaded end of said lower casing;
- a rod member axially movably mounted in a cylindrical cavity defined by said upper and lower casings and normally held by said diaphragms in a retracted position wherein the lower end of said rod member is remotest from said one end of said lower cylindrical casing when said tire has a normal internal pressure;
- a contact ring loosely fitted on said rod member and normally rested on a radially protruding surface on said rod member;
- a pair of semicircular stationary contacts mounted on an annular ledge on the inner wall of said upper casing;
- a conical compression spring mounted on said rod member in a prestressed state for urging said rod member toward said diaphragm, said rod member being moved from said retracted position into a protruded position by the action of said conical spring when the internal air pressure of said tire drops below a predetermined level, the lower end of said rod member being nearest from said one end of said lower cylindrical casing inversely deflecting said diaphragm and closing said contact ring on said semicircular stationary contacts on said upper casing to complete a power circuit of a warning device;
- and at least a permanent magnet embedded beneath said semicircular contacts for imparting a quick motion to the switch device.

* * * * *